April 19, 1927. 1,625,356
W. GEULEN
ASEPTIC LIGHTING TORCH
Filed Nov. 9, 1925
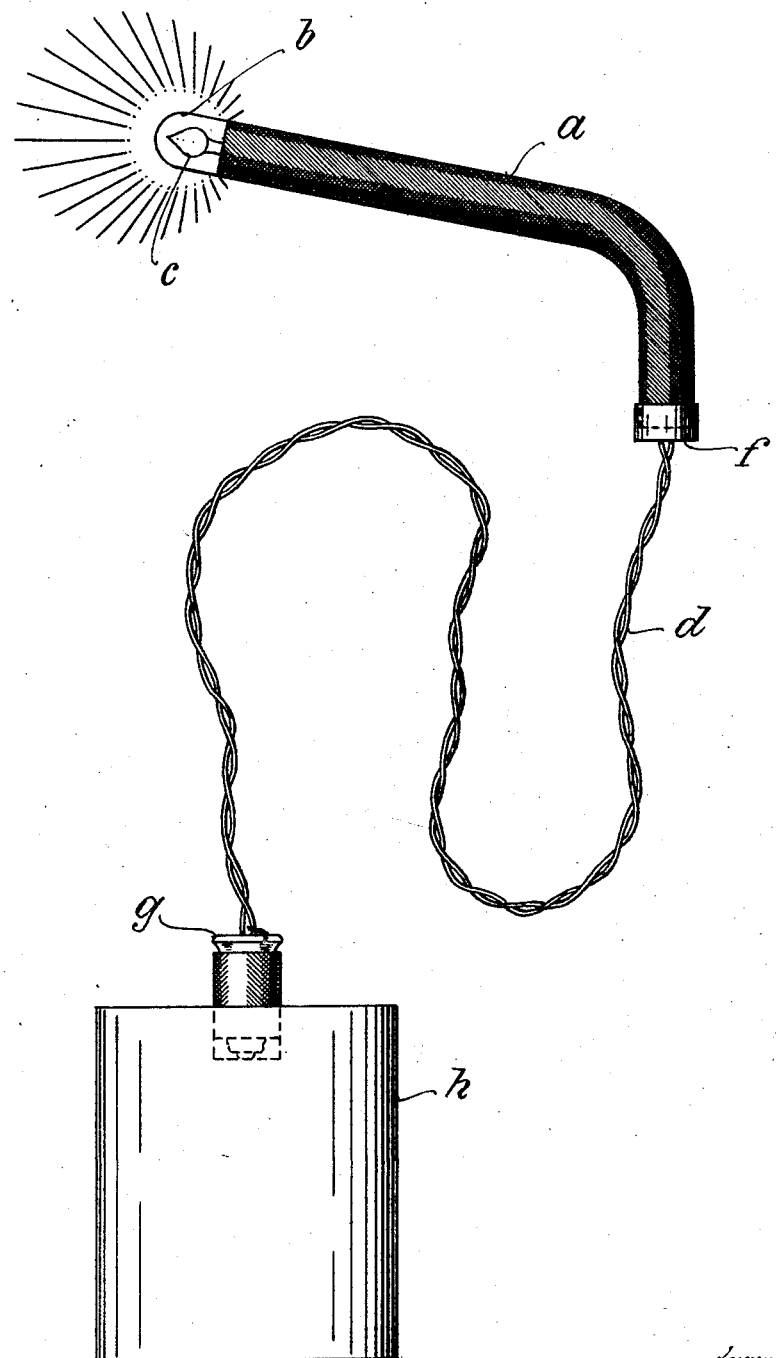

Patented Apr. 19, 1927.

1,625,356

UNITED STATES PATENT OFFICE.

WILHELM GEULEN, DECEASED, LATE OF FREIBURG, GERMANY; BY KLARA GEULEN, NÉE SCHREIBER, EXECUTRIX, OF FREIBURG, GERMANY, ASSIGNOR TO CARL HERZOG, OF FREIBURG, GERMANY.

ASEPTIC LIGHTING TORCH.

Application filed November 9, 1925, Serial No. 68,008, and in Germany May 10, 1924.

This invention has for its object to improve the construction of the rod-shaped torches for medical purposes in which the exchangeable source of light and the wires are enclosed in a glass tube closed at the front end by melting.

The improvement consists in making the transparent front end and the handle of the torch in one piece and of the same material, e. g. a glass tube, which with the exception of the front portion enclosing the source of light, is of dark colour to avoid light reflexion in the direction of the eyes of the observant. This new manner of making the rear part of the glass tube non-transparent presents, in comparison with the commonly used method according to which with this object in view a sleeve of hard rubber or the like is stripped over the rear part of the glass tube, the considerable advantage as regards aseptics that the surface of the torch is perfectly smooth over its entire length so that there are no joints which are to be rendered germ-free by aseptic treatment only with great difficulty. The improved lighting torch can be manufactured at comparatively low cost. As the lighting torch is made from the same material throughout, e. g. of glass, it cannot expand irregularly when heated, so that fracture of the glass is prevented.

An embodiment of the invention is shown by way of example, on the accompanying drawing in the only figure of which the improved lighting torch is shown in elevation in connection with a pocket-lamp battery, the glass tube being bent at its rear end almost at right angles.

$a$ is the glass tube of dark-coloured glass, $b$ the front end of the same which is closed by melting and made either from transparent or milky white glass. In the glass tube $a$ the incandescent lamp $c$ and a portion of the cable $d$ are located, the cable being securely held in the rear end of the glass tube by a stopper $f$. Any suitable means may be provided for centering the light bulb in the end of the tube, one example of which will be to make those portions of the cable $d$ which are located inside the tube sufficiently stiff or rigid to hold the light bulb in its centered position. The plug contact $g$ serves to connect the cable $d$ with the battery $h$.

I claim:—

An aseptic torch comprising a glass tube having a transparent end portion, an incandescent lamp in said portion to emit light therethrough, the remainder of the tube presenting opaque surfaces to the lamp whereby light transmission in the direction of the eyes of the observant is prevented, and means for connecting the lamp to a source of light.

In testimony whereof I affix my signature.

KLARA GEULEN, née SCHREIBER,
*Executrix of Wilhelm Geulen, Deceased.*